May 10, 1966 R. E. MORLEY 3,251,047

FREQUENCY MODULATION DATA PROCESSING

Filed Dec. 8, 1961 4 Sheets-Sheet 1

INVENTOR.
RICHARD E. MORLEY
BY
Philip J McFarland
ATTORNEY

INVENTOR.
RICHARD E. MORLEY
BY
Philip J McFarland
ATTORNEY

May 10, 1966 R. E. MORLEY 3,251,047

FREQUENCY MODULATION DATA PROCESSING

Filed Dec. 8, 1961 4 Sheets-Sheet 3

INVENTOR.
RICHARD E. MORLEY

BY

Philip J McFarland
ATTORNEY

INVENTOR.
RICHARD E. MORLEY
BY
Philip J McFarland
ATTORNEY 3,251,047

FREQUENCY MODULATION DATA PROCESSING

Richard E. Morley, Bedford, Mass., assignor to Laboratory for Electronics, Inc., Boston, Mass., a corporation of Delaware Filed Dec. 8, 1961, Ser. No. 157,905
6 Claims. (Cl. 340—174.1)

This invention pertains generally to data processing apparatus and method and particularly to such apparatus and method in which digital data is processed in a magnetic storage system.

It has been known for many years that digital data in the form of a train or group of electrical pulses may be processed in magnetic storage systems. For example, the so-called "return-to-zero" (RZ) and "non-return-to-zero" (NRZ) systems of recording have been extensively used. In the former system, the current in the magnetic head is, except when a pulse is to be recorded, zero. When it is desired to record a pulse, a current pulse is passed through the head to generate a changing magnetic flux to saturate the recording medium. On the other hand, in the latter system the writing head current is always sufficiently large to saturate the recording medium. Therefore, when it is desired to record a pulse, the writing head current is reversed to generate a changing magnetic flux to reverse the direction in which the recording medium is saturated.

Whichever of the just-mentioned systems is used, when the packing density, or number of pulses per inch of track length, is varied, the amplitude of the signal output of a reading head energized by such a signal varies inversely with packing density. Such a variation limits the maximum packing density of digital signals in known systems using RZ or NRZ techniques to approximately 800 pulses per inch for out of contact recording.

Other techniques have been developed to increase the maximum usable pulse packing density of digital signals. For example, the so-called "frequency-doubling" technique described by A. Gabor in Electronics, vol. 32, No. 42, p. 72, October 16, 1959, in an article entitled, "High Density Recording on Magnetic Tape," may be used to increase pulse packing density. The cited technique, however, requires that data pulses be synchronized with clock pulses, meaning that a rather complicated logical circuit be provided first to intermesh signal and clock pulses for recording and then to separate the two different kinds of pulses on readout.

Therefore, it is a primary object of this invention to provide improved apparatus and techniques for recording digital information at packing densities of more than 1000 pulses per linear inch of recording track.

Another object of this invention is to provide apparatus and techniques for processing digital information with a high degree of reliability.

Still another object of this invention is to attain the foregoing objects with standard known components.

Still another object of this invention is to provide a method for recording digital information in any known magnetic storage medium.

These and other objects of the invention are attained generally by combining what may be called, for convenience, a frequency modulation technique with a known NRZ recording technique. That is, the pulse train indicative of the digital data to be processed is applied to a free running multivibrator in such a manner that its period is changed only when a pulse corresponding to, say, a "one" is present in the pulse train. Consequently, the period of the output wave of the multivibrator varies from its normal value when a "zero" is present in the input pulse train to a second fixed value when a "one" is present therein. The output wave of the multivibrator is coupled through a power amplifier to a writing head, which latter element is disposed at such a distance from a recording medium that only the fundamental frequencies making up the square wave outputs of the multivibrator are effective to vary the magnetic state of the recording medium. When it is desired to read out the information stored in the recording medium, a split reading head is moved relative to the recording medium so that two signals, mirror images of each other, are generated. These signals are then amplified, differentiated, and applied to separate pulse generators, which elements are responsive only to, say positive-going input signals. The outputs of the pulse generators are added to produce a second pulse train similar to the initial pulse train except that the frequency of the second pulse train is twice the frequency of the initial pulse train. That is, there are two pulses in the second pulse train for each pulse in the initial pulse train, the time between each pair of pulses in the second pulse train being equal to one half the period between successive pulses in the input pulse train. The second pulse train is then led through a low pass filter finally to produce an amplitude varying signal corresponding to the initial pulse train.

For a more complete understanding of the invention, reference is now made to the explanation of a preferred embodiment of the invention shown in the accompanying drawings, in which.

Figure 1:
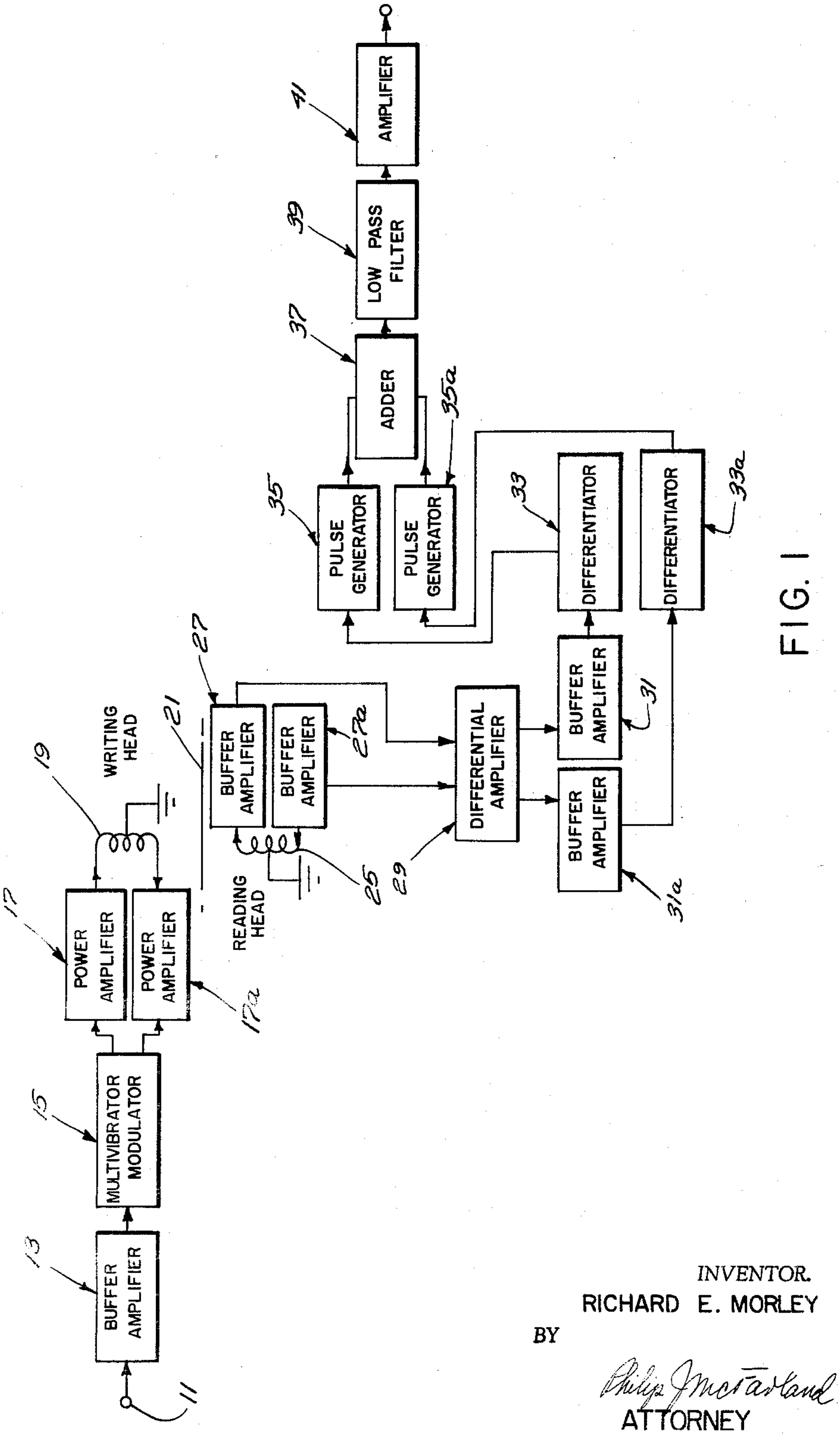
FIG. 1 is a block diagram of a recording system according to the invention showing the general arrangement of the various elements and the contemplated method.
Figure 3:
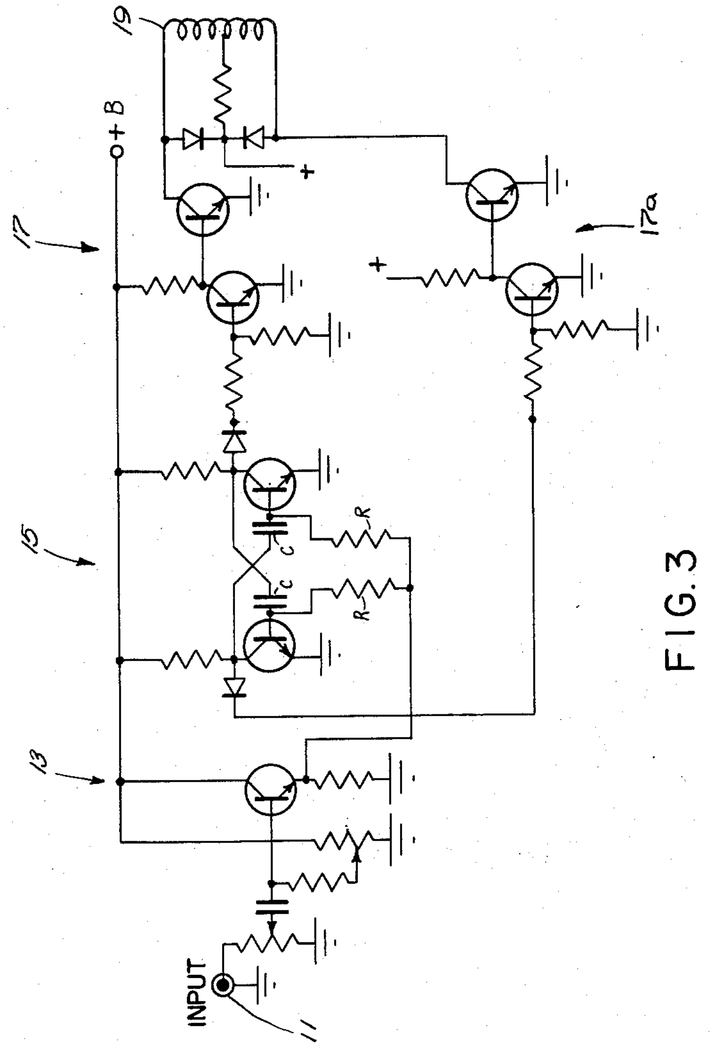
FIG. 3 is a schematic drawing showing the arrangement of a practical writing circuit according to the invention; and, FIG. 4 is a schematic drawing showing the arrangement of a practical reading circuit according to the invention; and, FIG. 5 is a drawing showing the wave forms at various places in the circuits shown in FIG. 3 and FIG. 4.
Figure 5:
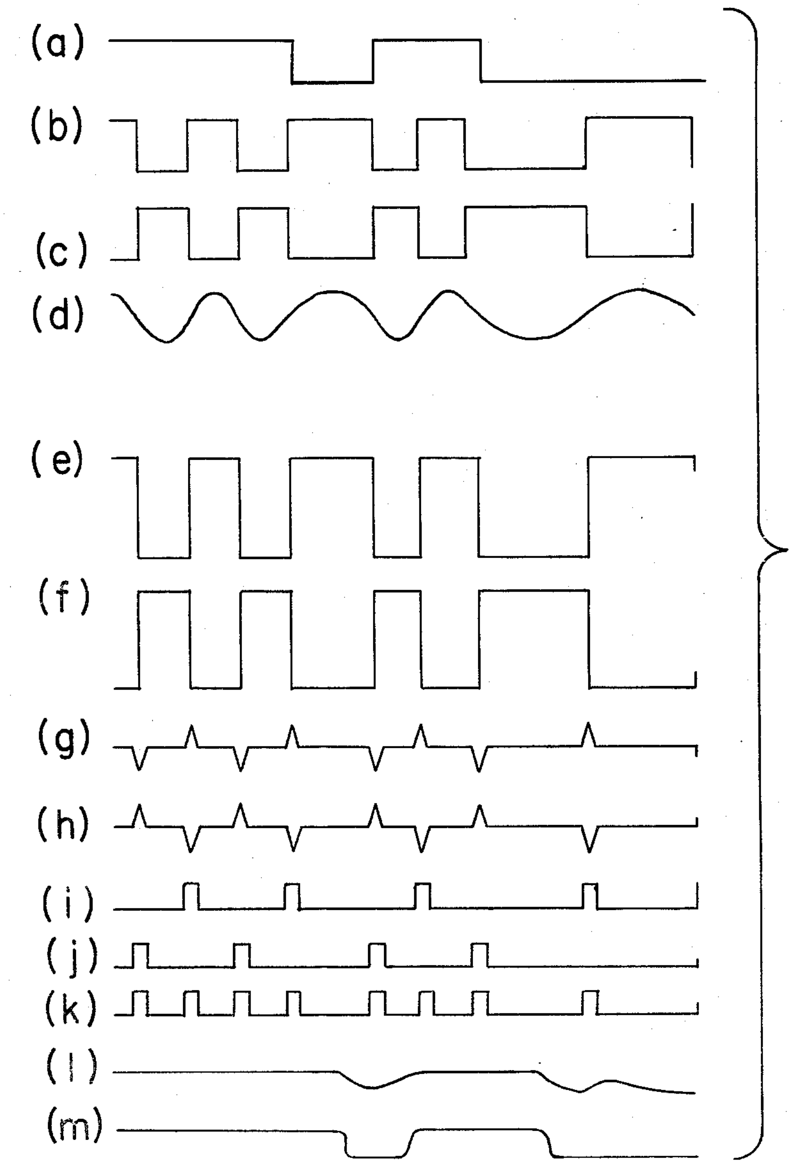

The construction and mode of operation of a preferred writing amplifier according to the invention is shown clearly in FIGS. 1, 3 and 5. A pulse train representative of the digital information being processed as, for example, the pulse train shown in FIG. 5 (*a*) is impressed on an input terminal 11. It will be understood, of course, that one voltage level of the pulse train is indicative of a binary "zero" and the other level is indicative of a binary "one." The signal impressed on the input terminal 11 is capacitively coupled to a buffer amplifier 13 passing through an impedance matching and gain adjusting network, here consisting a pair of potentiometers (unnumbered). The active element of the buffer amplifier is an emitter follower transistor. The output of the emitter follower is resistively coupled through resistors marked R in FIG. 3 to a multivibrator 15 which is so biased as to be free running. The period of oscillation of the multivibrator 15, however, is not constant but rather is dependent upon the amplitude of the output voltage of the buffer amplifier 13. In fact, the period of oscillation (T) of the multivibrator 15 may be very closely approximated by the formula:

$$T=2RC \ln \frac{Vcc+Vbb}{Vbb}$$

where C equals the value, in farads, of each of the capacitors marked "C: in FIG. 3";

$Vcc$ equals the value, in volts, of the +B supply to the multivibrator 15;

Vbb equals the value, in volts, of the output of the buffer amplifier 13; and R equals the value, in ohms, of each of the resistors marked R in FIG. 3.

It is obvious from the foregoing that when the voltage output of the buffer amplifier changes from one value to another the period of the multivibrator will also change. The outputs of the multivibrator 15 are resistively coupled through blocking diodes to a two-stage push-pull power amplifier 17, 17a to a split-coil writing head 19. Thus, a square wave driving current, as illustrated in FIG. 5 (*b*) and FIG. 5 (*c*) is applied to the writing head 19, the period of such a wave varying in accordance with the signal output of the multivibrator 15. This will be understood more in detail with reference to the waveform of FIG. 5 (*a*) (voltage output of the buffer amplifier) which gives rise to the waveforms illustrated in FIGS. 5 (*b*) and 5 (*c*). So long as the amplifier voltage output has a maximum amplitude, as shown toward the left of FIG. 5 (*a*), then the period of the waveform of FIG. 5 (*b*) remains fixed at the shorter of two predetermined values. When, however, the amplifier voltage output decreases, then the period of the waveform of FIG. 5 (*b*), as represented by the width of the second complete positive half cycle, becomes longer. And so it is during the remainder of the waveform of FIG. 5 (*b*), the period changing from one value to another whenever the amplitude of the amplifier voltage output of FIG. 5 (*a*) changes from one value to another. Also it will be observed that a similar condition obtains in FIG. 5 (*c*), the only difference being that the waveform of FIG. 5 (*c*) is opposite in phase from that of FIG. 5 (*b*). The amplitude of the driving current through the driving head 19 must, if NRZ recording is to be accomplished, sufficient to saturate a recording medium 21 in either direction.

It will be recognized that the particular form of the recording medium 21 is not essential to the invention. That is, a magnetic tape, disc or drum may be used. For simplicity, then, no details of any particular type of recording medium or necessary appurtenances thereto have been shown, it being evident that appropriate supporting and driving means depend on the particular type of recording medium chosen.

Figure 2:
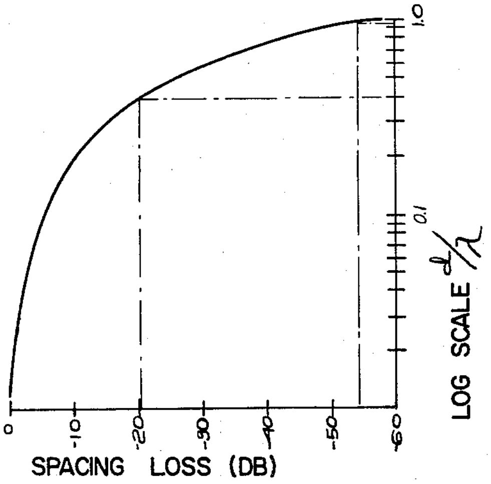
FIG. 2 is a graph showing in particular the manner in which the harmonics of the signal output of the multivibrator modulator are eliminated.

In the preferred embodiment, when it is desired to read out the recorded information from the magnetic recording medium 21, a split-coil reading head 25 is energized by moving the medium at a substantially constant speed at a distance from the reading head 25 as indicated in FIG. 2. That is, the reading head 25 is spaced from the recording medium 21 at such a distance that the ratio of distance to recorded wavelength is such that only the fundamental frequencies of the recorded signal are effective in energizing the reading head 25. As indicated in FIG. 2, when such a ratio is in the order of 0.3 the harmonics of the recorded signal are attenuated very much more than the fundamentals. It will be recognized, however, that such filtering, while effective in reducing the band width requirements of the following stages does not affect the information content of the signals out of the reading head 25.

Figure 4:
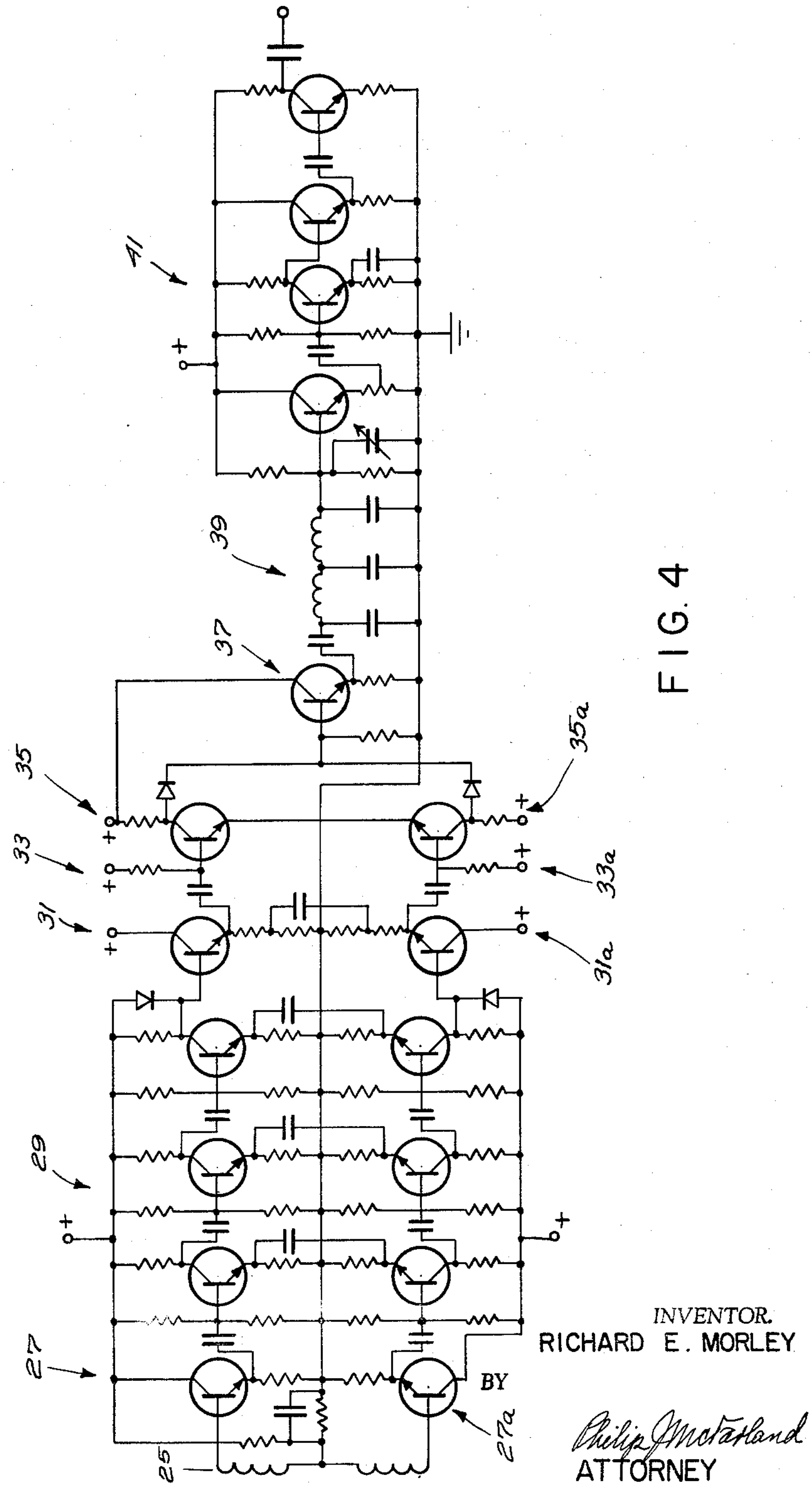

The signals out of the reading head are, as shown in FIGS. 5 (*e*) and (*f*) 180° out of phase with each other. These signals are directly coupled to separate buffer amplifiers 27, 27a, which as shown in FIG. 4 are emitter followers to provide impedance matching of the reading head 25 to the following stages. The outputs of the individual buffer amplifiers 27, 27a are capacitively coupled to separate, but cross-coupled, differential amplifiers 29, 29a, each with output limiting provided by the unnumbered diodes shown in the collector circuit of the last one of the transistors in each of the differential amplifiers 29, 29a so that the signal waveforms shown in FIGS. 5 (*e*) and (*f*) are produced. The limited signals are led through buffer amplifiers 31, 31a (again emitter followers for impedance matching purposes) to differentiators 33, 33a to produce the waveforms shown in FIGS. 5 (*g*) and (*h*). It will be noted that the positive-going pulses of FIG. 5 (*g*) correspond with the negative-going pulses of FIG. 5 (*h*) and vice versa. Therefore when the waveforms are fed into separate, but identically biased, pulsed generators 35, 35a waveforms as shown in FIGS. 5 (*i*) and (*j*) are produced. These latter waveforms are fed through an "OR" circuit 37, here shown simply as a pair of diodes each coupled to an emitter follower to produce the waveform shown in FIG. 5 (*k*) which waveform has a period equal to one-half the period of the multivibrator 13. The output of the last-mentioned emitter follower is capacitively coupled to a demodulating circuit, here shown as a low pass filter 39 having a cutoff frequency well below the lowest frequency component of the pulse waveform characterized by the first four pulses in FIG. 5 (*k*), to produce the output waveform shown in FIG. 5 (*l*), the amplitude of this waveform being a function of the pulse repetition rate. In particular, during the interval between the fourth and fifth pulse in FIG. 5 (*k*), which is a longer interval than that which exists between adjacent pulses one through four, the output waveform undergoes a decay. However, with the return of the pulse repetition rate in FIG. 5 (*k*) to the value characterized by pulses one through four, the output waveform reverts to its initial value. A similar decay will be observed toward the right of FIG. 5 (*l*) since the repetition rate of the pulses in FIG. 5 (*k*) changes once again. The output of the demodulating circuit is then amplified in a direct coupled amplifier to produce the signal waveform shown in FIG. 5 (*m*), which waveform is similar to the waveform shown in FIG. 5 (*l*) except that the amplitude variations of the latter have been made more abrupt by means of conventional shaping techniques which are applied in the process of amplification. Thus, a signal representative of digital information has been derived and stored in a magnetic storage medium which signal may be later reproduced.

A moment's thought will make it clear that the maximum rate at which information may be processed is related to the free-running frequency of the multivibrator 15. That is, information may be fed into the disclosed processing system at any rate so long as the minimum interval between successive bits of information exceeds one half the period of the multivibrator 15. It will also be clear that information may be fed into the system asynchronously with respect to the period of the multivibrator 15.

Many variations in the form of the preferred embodiment of the invention will now be apparent to those having skill in the art. For example, it is evident that when a rotating recording medium, as a drum or a disc, is used gating of the power amplifiers 17, 17a or the writing head 19 may be utilized to advantage to prevent overlapped tracks on the recording medium 21. Further it will be obvious that it may on occasion be advantageous to provide either externally or internally generated clock pulses. It will also be evident that the particular circuitry here shown and explained may be varied as desired to provide for varying degrees of desired packing densities. It is felt, therefore, that the invention should not be limited to the illustrated embodiment but rather by the spirit and scope of the appended claims.

What is claimed is:

1. Data processing apparatus in which digital information in the form of a train of pulses in which a first pulse level represents a "zero" and a second pulse level represents a "one" is processed, comprising (a) means for generating a magnetic track on a magnetic recording medium, the frequency of the so-generated track from point to point thereon varying in accordance with the particular arrangement of pulse levels in the train of pulses being processed;

(b) means for deriving an electric signal corresponding in frequency with the frequency of the magnetic track;

(c) means for doubling the frequency of the electric signal; and, (d) means for demodulating the doubled frequency to derive a signal output corresponding to the original train of pulses.

2. Data processing apparatus in which digital information in the form of a sequence of electrical pulses is stored in a magnetic storage medium comprising:

(a) a magnetic writing head adjacent to such magnetic storage medium; and (b) driving means for energizing the magnetic writing head in accordance with the particular arrangement of sequential electrical pulses representing digital information to be stored, (c) the driving means including a free-running multivibrator having a fundamental frequency of oscillation and (d) means for varying such fundamental frequency oscillation in accordance with the particular arrangement of sequential electrical pulses, and the spacing between the magnetic recording head and the magnetic storage medium being between .3 and 0.5 times the wavelength of the fundamental frequency of the output of the multivibrator.

3. Data processing apparatus as in claim 2 having, additionally:

(a) a magnetic reading head adjacent to the magnetic storage medium and energized by the signals stored therein;

(b) dual channel amplifier means each of the channels therein producing a signal of varying frequencies in accordance with the output of the magnetic reading head, the output of each of the channels being a mirror image of the other;

(c) means for generating interlaced equal-energy pulses from the outputs of the dual channel amplifier; and, (d) means for integrating such interlaced equal energy pulses to produce an output signal varying in amplitude in accordance with the frequency of the interlaced equal energy pulses.

4. In data processing apparatus in which digital information is stored in a magnetic storage medium in the form of a sequence of variations in the magnetic state of the magnetic storage medium moving at a constant rate, the frequency of the variations being equal to either one of two frequencies, the first frequency representing a "one" and the second frequency representing a "zero," reading apparatus comprising:

(a) a split-wound reading head energized in accordance with the variations in the magnetic state of the magnetic storage medium;

(b) overdriven amplifier means separately amplifying the output of each winding of the reading head to produce a first and a second square wave which are mirror images of each other;

(c) first and second differentiating means connected separately to the outputs of the overdriven amplifier to produce a first and a second train of pulses, the negative-going pulses of the first train corresponding in time to the positive-going pulses of the second train and the positive-going pulses of the first train corresponding in time to the negative-going pulses of the second train of pulses;

(d) gating means to pass only similarly poled pulses from the first and the second train of pulses to produce a composite train of pulses in which all pulses are similarly poled, the frequency of such pulses being twice the first frequency to represent a "one" and twice the second frequency to represent a "zero";

(e) low pass filter means including an LC integrating circuit, selectively to attenuate the higher frequency pulses in the composite train of pulses and to produce a signal output varying in amplitude in accordance with the distribution of pulses in the composite train.

5. The method of processing serial binary information comprising:

(a) generating a first train of square waves wherein the interval between successive edges assumes one of two values indicative, respectively, of a binary "one" or a binary "zero" in accordance with the binary "ones" and binary "zeroes" in the information being processed;

(b) transmitting the first train of square waves to a receiving device;

(c) producing, in the receiving device, a second train having a pulse rate equal to frequency twice the frequency of the first train of square waves; and (d) demodulating the second train of square waves to obtain a signal having an amplitude of one of two levels corresponding to the binary "ones" and binary "zeroes" in the information being processed.

6. The method of processing a pulse train representative of information comprising the steps of:

(a) impressing the pulse train on a free running multivibrator to change its cyclic period in accordance with the pulse train;

(b) actuating, with the signal output of the multivibrator, an output device to translate the signal output of the multivibrator into a signal having a period characteristic corresponding to the signal output of the multivibrator;

(c) transmitting the signal from the output device to a receiving device;

(d) deriving, in the receiving device, a pulse train having twice the period of the multivibrator signal output; and, (e) demodulating the last mentioned pulse train to obtain a signal having an amplitude corresponding to the pulse train impressed on the multivibrator.

References Cited by the Examiner

Pages 121–123, August 1952, Sargeant et al., Electronics, "Vibration Recorder Tests Army Packaging."

BERNARD KONICK, *Primary Examiner.*

IRVING L. SRAGOW, *Examiner.*

R. M. JENNINGS, A. I. NEUSTADT, *Assistant Examiners.*